April 5, 1960

S. A. TORSTENSON ET AL 2,931,977

APPARATUS FOR DETERMINING ABSORPTION AND
LIQUID PENETRATION OF PAPER

Filed Oct. 19, 1955

INVENTORS
STIG A. TORSTENSON
ERNEST G. EMMERT

BY Tom Walker

April 5, 1960    S. A. TORSTENSON ET AL    2,931,977
APPARATUS FOR DETERMINING ABSORPTION AND
LIQUID PENETRATION OF PAPER
Filed Oct. 19, 1955    4 Sheets-Sheet 3

INVENTORS
STIG A. TORSTENSON
ERNEST G. EMMERT
BY
Tom Walker

April 5, 1960

S. A. TORSTENSON ET AL 2,931,977

APPARATUS FOR DETERMINING ABSORPTION AND
LIQUID PENETRATION OF PAPER

Filed Oct. 19, 1955

INVENTORS
STIG A. TORSTENSON
ERNEST G. EMMERT

BY Tom Walker

2,931,977

APPARATUS FOR DETERMINING ABSORPTION AND LIQUID PENETRATION OF PAPER

Stig A. Torstenson, Park Ridge, N.J., and Ernest G. Emmert, Dayton, Ohio, assignors to The Standard Register Company, Dayton, Ohio, a corporation of Ohio Application October 19, 1955, Serial No. 541,489

8 Claims. (Cl. 324—65)

This invention relates to methods of and apparatus for determining the speed of liquid absorption and penetration of paper. Although not so limited, the invention has especial utility in testing for consistency in the quality of paper bought in large lots for the purpose of printing business forms.

The object of the invention is to simplify the construction as well as the means and mode of operation of such test apparatus, whereby such apparatus may not only be economically manufactured, but will be more efficient and satisfactory in use, adaptable to a wide variety of applications, and be unlikely to get out of repair.

A further object of the invention is to introduce a generally new method and apparatus for testing the consistency of quality in paper according to a concept in which the time required for liquid penetration of selected lots of paper accurately is measured for comparison purposes.

Another object of the invention is to present a simple, automatically acting apparatus substantially obviating the element of human error in the testing operation.

A further object of the invention is to place the several operations of clamping, testing and releasing of the paper under control of a single operating means.

A further object of the invention is to provide a moisture testing apparatus possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in perspective of an absorption testing apparatus in accordance with the illustrated embodiment of the invention;

Like parts are indicated by similar characters of reference throughout the several views.

Figure 1:
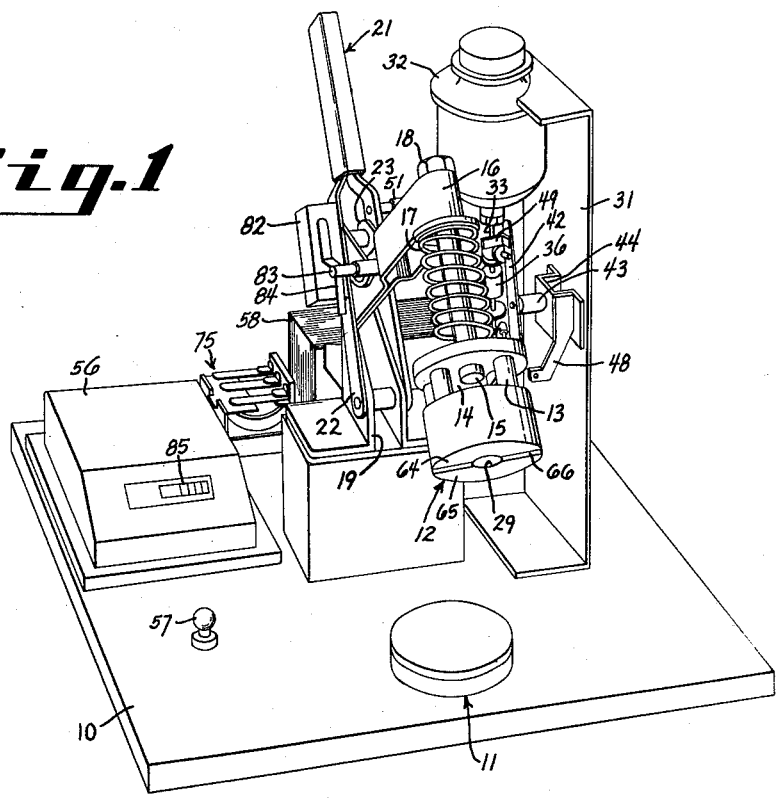
Figure 2:
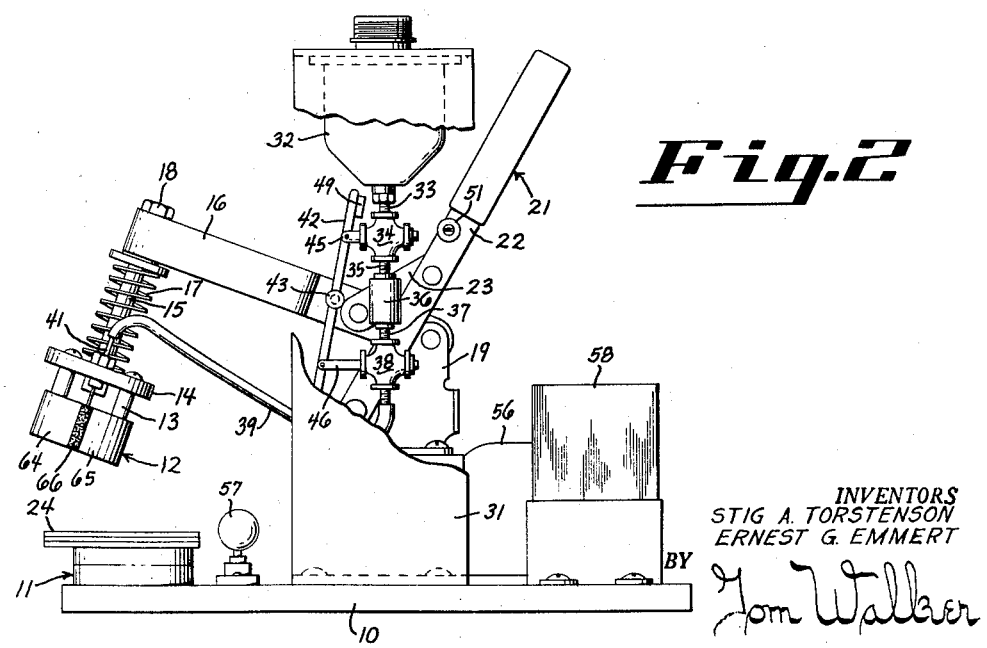
Fig. 2 is a view in side elevation, partly broken away, of the apparatus of Fig. 1.

Referring to the drawings, in accordance with the illustrated embodiment of the invention, a testing apparatus as described comprises an assembly of parts mounted upon a common base plate 10. A relatively stationary electrode 11 is on the base 10. In overlying relatively movable relation to the stationary electrode 11 is a movable electrode 12 connected by studs 13 to a non-conductive carrier plate 14 which is in turn mounted upon the lower end of a post 15 which has its upper end loosely received in the outer end of an arm 16. A compression spring 17 surrounds the post 15 and is interposed between the carrier plate 14 and the arm 16. A nut 18 on the upper or outer end of the post 15 holds the parts in assembled relation. The other or inner end of the arm 16 is pivotally connected to a stationary bracket member 19. A manually operable lever 21 has a bifurcated lower end 22 in embracing relation to the arm 16 and also pivotally connected to the bracket member 19. A link means 23 is pivotally connected at its one end to the handle 21 and at its other end to the arm 16. According to the construction and arrangement of parts, the handle 21 may be grasped and pulled forwardly or to the left as seen in Fig. 2 to effect an approaching motion of the movable electrode 12 relatively to the stationary electrode 11. Continuing this motion until travel of the electrode 12 is interrupted, the parts of the handle-electrode assembly retain their starting positions relatively to one another but as movement of the electrode 12 is interrupted, a slight additional movement of the handle 21 may be effected whereby to move the arm 16 relatively to the post 15 and to compress the spring 17 to apply a clamping pressure through the electrodes upon material held therebetween. As indicated, such material may be multiple sheets of paper 24. Return motion of the handle 21, as may be effected by hand or by suitable spring pressure, results first in a releasing of the applied clamping pressure then in a retracting of the upper electrode back to the elevated non-operating position shown in Figs. 1 and 2.

Figure 3:
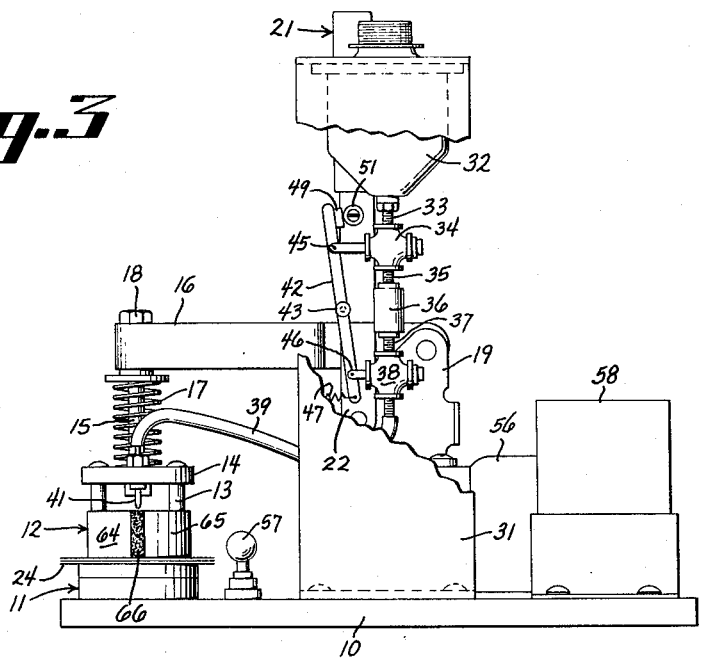
Fig. 3 is a view similar to Fig. 2, but showing the operating lever adjusted for operation of the apparatus.
Figure 4:
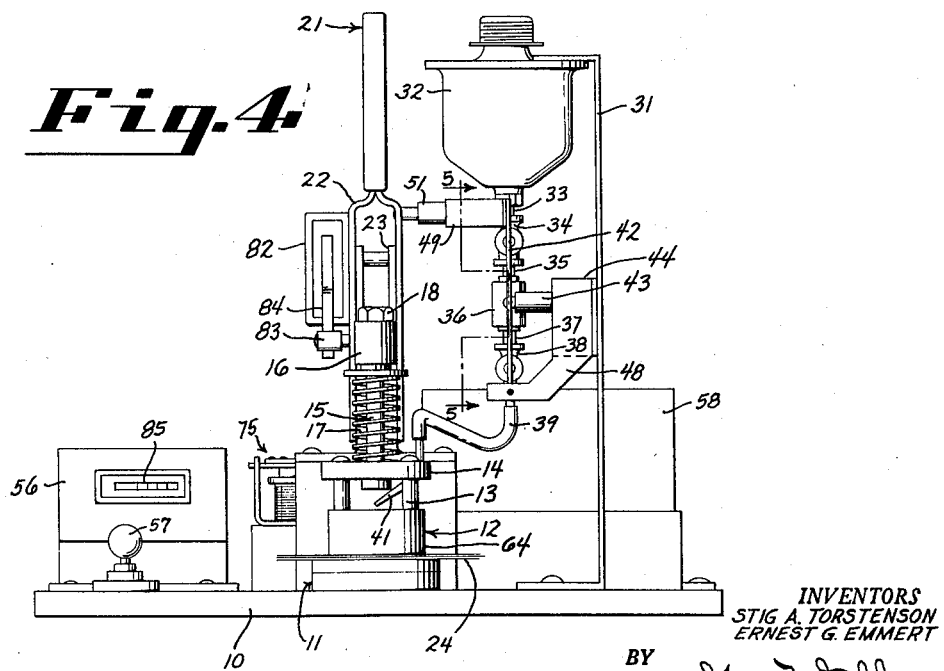
Fig. 4 is a view of the apparatus in front elevation, shown positioned as in Fig. 3.

The upper electrode 12 has a central through opening which when the jaw-like electrodes are closed upon one another, as viewed in Fig. 3, becomes a cavity for admission of a liquid electrolyte. Such material, introduced into the opening or cavity 29, is thus in simultaneous contact with the electrode 12 and with the surface of the quantity of paper 24 on one side thereof. After an interval of time necessary for the liquid material to soak through the paper, contact also is made with the lower electrode 11 and the two electrodes are in this manner so electrically connected.

Figure 5:
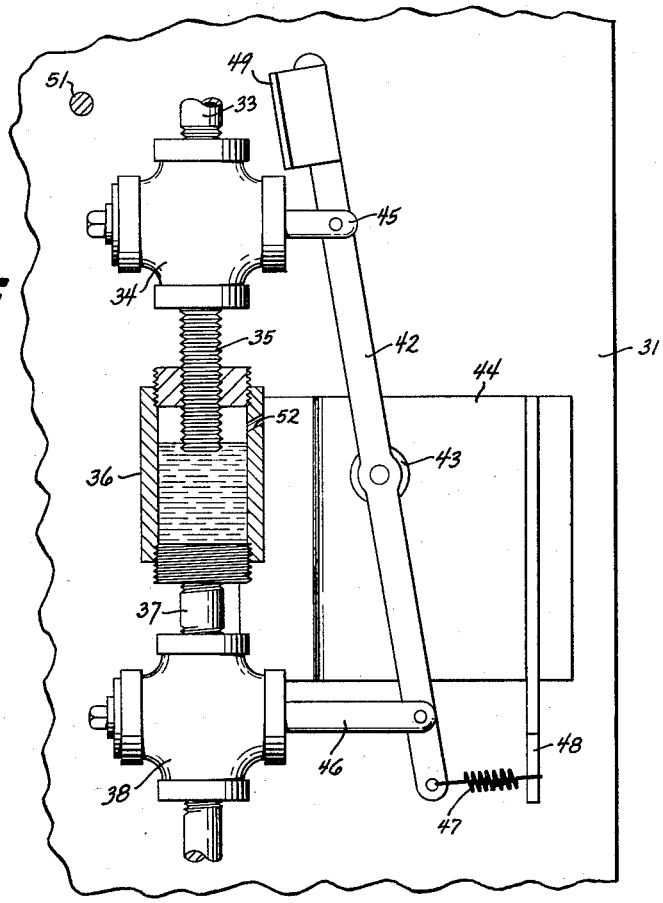
Fig. 5 is a detail view, enlarged with respect to the preceding views, of a reservoir and valve mechanism for deposit of the liquid electrolyte.
Figure 6:
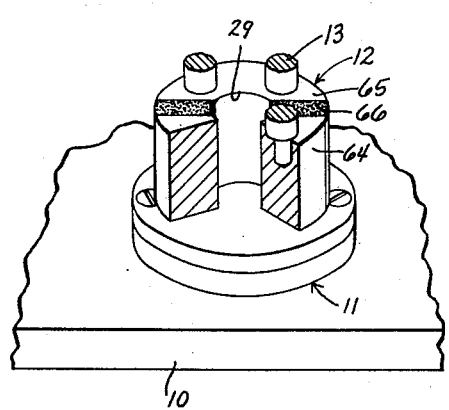
Fig. 6 is a detail view in perspective and partly broken away of the upper electrode.
Figure 8:
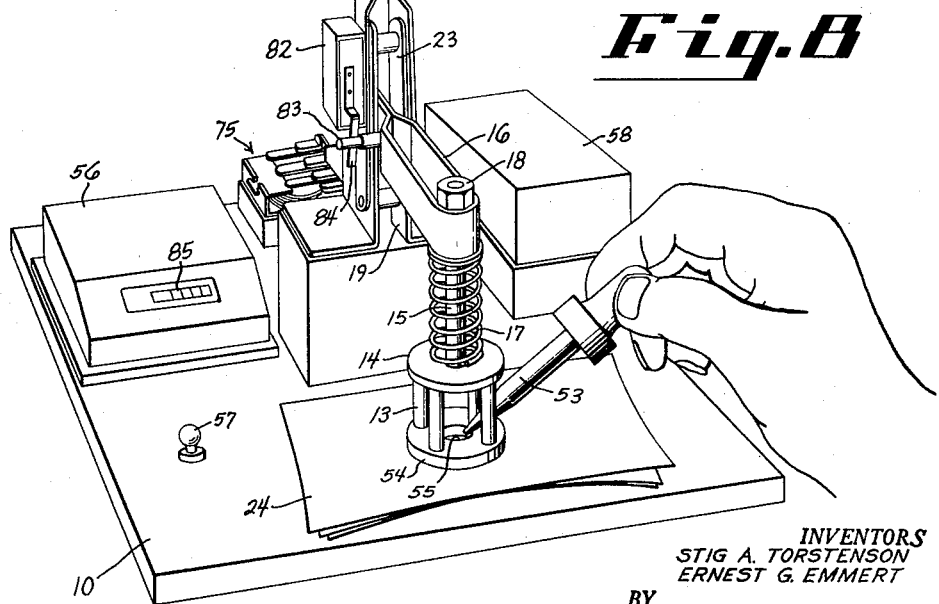
Fig. 8 is a view similar to Fig. 1, but in an operating position, and showing a manual rather than an automatic means for depositing the electrolyte.

The liquid electrolyte may be introduced automatically, as shown in Figs. 1 through 6, or manually as seen in Fig. 8. In the case of the automatic means, a vertically elongated bracket 31 is secured to the base plate 10. At its upper end, the bracket 31 supports a reservoir 32 of the electrolyte liquid. Referring more particularly to Fig. 5, the reservoir 32 is connected by a downwardly extending axial pipe 33 with a valve 34 and this is in turn connected by an externally threaded tube 35 with an intermediate or charging chamber 36. The latter is connected by a pipe 37 with another valve 38 and from the valve 38 conductor means, including a flexible conduit 39, extends to an injector tube 41 carried on the plate 14 and arranged to drop liquid into the opening or cavity 29. The valves 34 and 38 are controlled by a lever 42 pivotally connected at about its mid point to a stud 43 set in an auxiliary bracket 44 fastened to the side of the upright larger bracket 31. Stems 45 and 46, extending from the respective valves 34 and 38, are pivotally connected to the lever 42 on the opposite sides of the pivot stud 43. A tension spring 47 is attached to one end of the lever 42 and anchored to an arm 48 on the auxiliary bracket 44. Under influence of the spring 47, the lever 42 tends normally to assume a position as shown in Fig. 5 wherein the stem 45 of valve 34 is in an inward position within the valve in which position flow through the valve is open. The stem 46, of valve 38, is at the same time extended, in which position flow through the valve 38 is closed. A rocking motion of the lever 42 in a clockwise direction, against the urging of spring 47, reverses the position of the valves, closing valve 34 and opening valve 38. To so move the lever 42, a tab piece 49 is attached to the other or upper end thereof in the path of movement of a laterally projecting stud 51 on the handle 21. In the course of forward movement of the handle 21, the stud 51 reaches contact with the tab 49 at about the same time that the upper electrode 12 limits against the work. Continued forward motion of the handle, to apply a clamping pressure to the work, results in a rocking of the lever 42 against the urging of spring 47 and a reversing of the position of the valves 34 and 38 as above described.

The reservoir 32 is air tight. The auxiliary reservoir or charging chamber 36 is connected to atmosphere through an opening 52 near the upper end thereof. The tube 35 interconnecting the valve 34 and chamber 36 extends downward into the interior of chamber 36. In the open position of valve 34, liquid may drop from the reservoir 32 into chamber 36 and be replaced by air drawn through opening 52 and flowing in a reverse direction upward through the tube 35 and valve 34. As the liquid level in the chamber 36 rises, however, it will finally rise above and close the lower end of the tube 35 from communication with the opening 52. Flow from the reservoir 32 into the chamber 36 will accordingly cease. The amount of liquid so admitted to the chamber 36 becomes in effect the charge to be admitted to the opening or cavity 29 and this amount may be varied by rotatively adjusting the tube 35 so that its lower end is lower or higher in the chamber 36. Reversal of the position of the valves, as before described, will permit the liquid in chamber 36 to flow downward through the narrow open valve 38 and through the flexible conduit 39 to injector tube 41 and thence into the cavity 29. The admission of the liquid electrolyte to the cavity 29 thus is an automatic operation occurring in accompaniment with or immediately after the clamping of the paper between the electrodes. The chamber 36 is recharged automatically as return adjustment of the handle 21 releases the lever 42 and permits it to reassume the position shown in Fig. 5 under the influence of spring 47.

The liquid electrolyte may alternatively be supplied by hand, as indicated in Fig. 8. Thus, there is here shown an apparatus identical to that of the above considered embodiment of the invention, except for omission of the parts relating to automatic admission of the electrolyte. In the operation of the apparatus as shown in Fig. 8, forward motion of the handle 21 is effective to clamp the paper sheet material 24 between the electrodes and the electrolyte thereafter is supplied by an eye dropper 53 as indicated, or by like means. The electrode 12 of the previously considered embodiment may in this instance be replaced by an electrode 54 of shorter height and having a central opening 55. Hand addition of the liquid electrolyte may be advantageous in testing certain types of paper wherein the penetration is slow. With this paper, the liquid diffuses laterally in the paper more readily than it penetrates and a considerable amount of fluid must be added to keep the electrode cavity filled until full penetration takes place.

Testing apparatus in accordance with the illustrated embodiments of the invention further comprises an electric timer 56, a signal light 57, a transformer 58 and other means constituting an electrical control circuit, all mounted upon the base plate 10.

Figure 7:
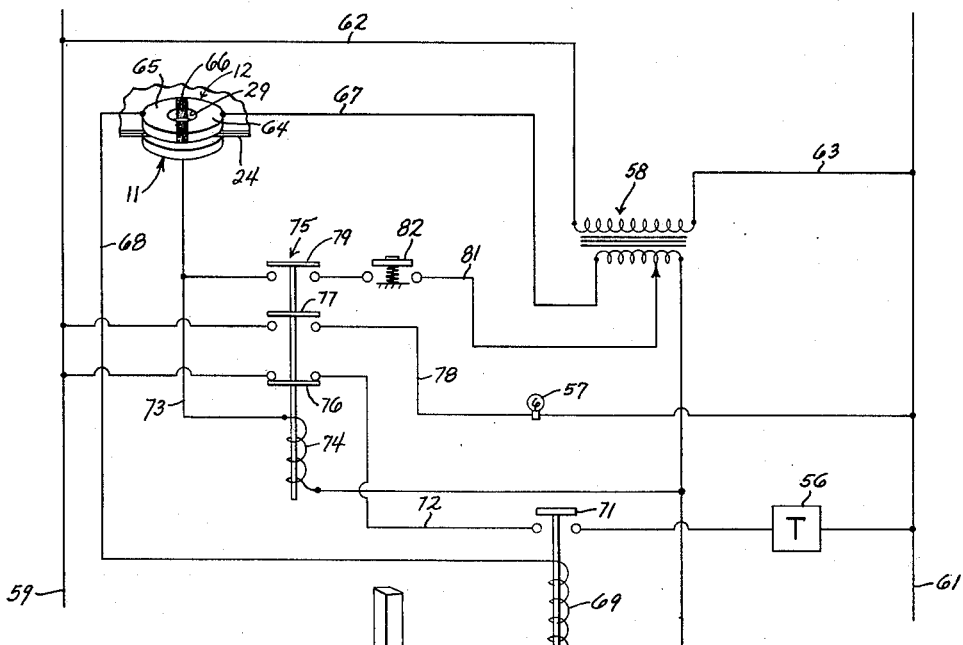
Fig. 7 is a wiring diagram of the apparatus.

Referring to Fig. 7, the primary of the transformer 58 is connected between power input lines 59 and 61 by respective conductors 62 and 63. The upper electrodes 12 is split into segments 64 and 65 separated by a strip 66 of a non-conductive material such as Bakelite. The segment 64 is connected by a lead 67 to the secondary of the transformer 58. The segment 65 is connected by a lead 68 to the secondary of the transformer and interposed in the lead 68 is an electro magnetic coil 69 which when energized closes a switch 71 in a conductor 72 extending between the power input lines 59 and 61. The timer 56 is interposed in the conductor 72 to be energized when the switch 71 is closed.

Dropping of the liquid electrolyte into the cavity 29 serves electrically to bridge the segments 64 and 65 of the electrode 12. Accordingly, immediately upon addition of the electrolyte, the coil 69 is energized to close switch 71 and operation of the timer 56 is begun. After a period of time the electrolyte soaks through the paper and establishes electrical contact between the electrode 11 and the upper electrode 12. The electrode 11 is connected by a conductor 73 to the lead 68 extending to the secondary. In the conductor 73 is an electro magnet coil 74 energized by the making of electrical contact between the electrodes as above described. The magnetic coil 74 operates a three part switch assembly 75 comprising a normally closed switch element 76 in the conductor 72, a normally open switch element 77 in a conductor 78 extending between the input lines 59 and 61 and a switch element 79 normally open in a lead 81 which is in parallel relation to the lead 73. In the conductor 78 is the signal light 57. In the lead 81 is a micro switch 82 normally open. The switch 82 is mounted on the side of handle 21 and is operated by a laterally projecting stud 83 on the electrode supporting arm 16 acting through a finger 84 on the switch. The stud 83 and switch 82 move in unison during the initial travel of the handle 21 to engage the electrode 12 with the work. Continuing movement of the handle, to clamp the work between the electrodes, causes the stud 83 to depress the finger 84 of the switch whereby to close the switch in line 81. The energizing of the coil 74, in response to closing of a circuit across the electrodes 11 and 12, pulls down the switch device 75. In so moving, switch element 76 moves to open position in conductor 72 and so interrupts the flow of current through the timer 56, stopping the timer. At the same time, switch elements 77 and 79 move to closed positions in their respective conductors 78 and 81, thus energizing signal light 57 and closing a circuit through the parallel or bypass conductor 81, the switch 82 having been previously closed by actuation of the handle 21 as above described. A return motion of the handle 21 to relieve the clamping pressure exerted by the electrodes upon the paper, releases the valve 82 which rises to the position shown and interrupts the holding circuit.

The system operates, it will be apparent, to provide a visual indication on the dial 83 of the timer 56 of the elapsed time between admission of the electrolyte to the cavity 29 and the penetration of the electrolyte through the paper to the electrode 11 on the opposite side thereof. The signal light 57 may be used for hand timing of the penetration interval if desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. Apparatus for determining absorption and liquid penetration of paper, including a pair of electrodes arranged to receive a quantity of paper therebetween, means for clamping said electrodes upon opposite sides of said paper, means for depositing a liquid electrolyte on one side of said paper through one of said electrodes automatically responsive to actuation of said clamping means, and an electrical signaling circuit between said electrodes closed by said electrolyte as it soaks through the paper into contact with the other one of said electrodes.

2. Apparatus for determining absorption and liquid penetration of paper, including a pair of electrodes arranged to receive a quantity of paper therebetween, means for clamping said electrodes upon opposite sides of said paper, means connecting said electrodes in a signaling circuit, and means operable by said clamping means for depositing a liquid electrolyte on one side of said paper in simultaneous contact with one of said electrodes, said electrolyte soaking through the paper to the other electrode to close said signaling circuit.

3. Apparatus according to claim 2, characterized in that said last named means includes an electrolyte dispensing valve opened by movement of said clamping means to clamp said electrodes upon the paper and closed by a reverse movement of said clamping means.

4. Apparatus for determining absorption and penetration of paper, including a pair of electrodes engageable on opposite sides of a quantity of paper, one of said electrodes comprising electrically separated segments engaging the paper and bridged by a liquid electrolyte deposited on one side of said paper in contact with said one electrode, an electrical timing circuit closed by the bridging of said segments and opened by electrical contact between said electrodes established by the soaking through of said paper of the electrolyte, and means for depositing the liquid electrolyte on said paper including an opening said one electrode for admitting the electrolyte to the paper underlying said one electrode.

5. Apparatus for determining absorption and penetration of paper including a pair of electrodes in opposed spaced relation, means for displacing one of said electrodes to clamp an element of paper in fixed relation to the other of said electrodes, said one electrode consisting of electrically conductive segments in laterally spaced relation to form a passage therebetween for introduction of liquid electrolyte to one surface of the paper, said segments having engaging surfaces in a common plane and being electrically connected on application of sufficient electrolyte to said one surface of said paper to cause contact of the electrolyte with both segments, means for signalling said electrical connection and further means for signalling the penetration of said electrolyte to said other electrode.

6. Apparatus for determining absorption and penetration of paper, including a pair of electrodes engageable to opposite sides of a quantity of paper, one of said electrodes being a divided electrode which has two electrically insulated portions in contact with one surface of the paper, a timer, means for depositing a liquid electrolyte on one side of said paper in contact with said divided electrode, means connected to both portions of said divided electrode to actuate said timer when said liquid electrolyte contacts both portions of said divided electrode, said electrolyte connecting said electrodes after an interval of time during which the electrolyte soaks through the paper into contact with the other electrode, and means interrupting said timer as the electrolyte electrically connects the pair of electrodes.

7. Apparatus for determining absorption and penetration of paper, including a pair of electrodes engageable on opposite sides of a quantity of paper, one of said electrodes comprising electrically separated segments engaging the paper and bridged by a liquid electrolyte deposited on one side of said paper in contact with said one electrode, an electrical timing circuit closed by the bridging of said segments and opened by electrical contact between said electrodes established by the soaking through of said paper of the electrolyte, and means for depositing the liquid electrolyte on said paper including an opening in said one electrode for admitting the electrolyte to the paper underlying said one electrode, the last said means also including a reservoir of liquid electrolyte and means for admitting said electrolyte to said opening from said reservoir in response to pressurized engagement of said electrodes to said paper.

8. Apparatus for determining absorption and penetration of paper including a pair of electrodes in opposed spaced relation, means for displacing one of said electrodes to clamp an element of paper in fixed relation to the other of said electrodes, said one electrode consisting of electrically conductive segments in laterally spaced relation to form a passage therebetween for introduction of liquid electrolyte to one surface of the paper, said segments having engaging surfaces in a common plane and being electrically connected on application of sufficient electrolyte to said one surface of said paper to cause contact of the electrolyte with both segments, means for signalling said electrical connection, and further means for signalling the penetration of said electrolyte to said other electrode, said passage being defined by insulating means between said segments and said means for displacing said one electrode having means connected to automatically introduce the electrolyte on clamying of the paper between said electrodes.

References Cited in the file of this patent

UNITED STATES PATENTS

| | | |
|---|---|---|
| 2,491,689 | Pollock | Dec. 20, 1949 |
| 2,568,199 | Martinet | Sept. 18, 1951 |
| 2,681,571 | Becker | June 22, 1954 |
| 2,691,135 | Wooding | Oct. 5, 1954 |
| 2,691,136 | Waard | Oct. 5, 1954 |